United States Patent
Furuta

(10) Patent No.: US 7,103,545 B2
(45) Date of Patent: Sep. 5, 2006

(54) VOICE-ACTUATED MACHINE BODY CONTROL APPARATUS FOR CONSTRUCTION MACHINE

(75) Inventor: Hideto Furuta, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 922 days.

(21) Appl. No.: 10/090,000

(22) PCT Filed: Mar. 9, 2001

(86) PCT No.: PCT/JP01/01855

§ 371 (c)(1),
(2), (4) Date: Apr. 8, 2002

(87) PCT Pub. No.: WO02/12966

PCT Pub. Date: Feb. 14, 2002

(65) Prior Publication Data

US 2002/0152079 A1 Oct. 17, 2002

(30) Foreign Application Priority Data

Aug. 7, 2000 (JP) .............................. 2000-238021

(51) Int. Cl.
*G10L 17/00* (2006.01)
(52) U.S. Cl. ...................... 704/246; 704/275
(58) Field of Classification Search ................ 704/246, 704/273–275
See application file for complete search history.

(56) References Cited

U.S. PATENT DOCUMENTS

| | | | |
|---|---|---|---|
| 5,214,707 A * | 5/1993 | Fujimoto et al. | 704/275 |
| 5,774,858 A * | 6/1998 | Taubkin et al. | 704/273 |
| 5,956,465 A | 9/1999 | Takagi et al. | |
| 6,553,130 B1 * | 4/2003 | Lemelson et al. | 382/104 |
| 6,703,944 B1 * | 3/2004 | Obradovich | 340/903 |

FOREIGN PATENT DOCUMENTS

| | | | |
|---|---|---|---|
| JP | 57-186593 | | 11/1982 |
| JP | 63-37397 | | 2/1988 |
| JP | 03-187423 | | 8/1991 |
| JP | 05-47062 | * | 6/1993 |
| JP | 05-64254 | | 8/1993 |
| JP | 06-156119 | | 6/1994 |
| JP | 06-320457 | | 11/1994 |

(Continued)

*Primary Examiner*—Angela Armstrong
(74) *Attorney, Agent, or Firm*—Morrison & Foerster LLP

(57) ABSTRACT

A voice-actuated machine body control apparatus for a construction machine is provided. The voice-actuated machine body control apparatus comprises speech recognition means (1*a*) capable of speech-recognizing a voice command representative of an instruction by voice regarding a movement of a machine body (80), machine body control means (1*e*) capable of controlling the machine body movement based on a result of the recognition by the speech recognition means (1*a*), obstacle recognition means (1*b*) capable of detecting the presence of an object outside the machine body which may possibly make an obstacle to the machine body movement, and avoidance means (1*c*) capable of inhibiting, when the presence of an object outside of the machine body is detected by the obstacle recognition means (1*b*), the machine body movement in accordance with the voice command preferentially to the control by the machine body control means (1*e*) thereby to avoid an inappropriate movement of the machine body (80). Thus, the construction machine (80) can be operated appropriately with voice uttered by the operator while the operator does not operate a joystick, a pedal or the like and does not perform an inputting operation using a switch or the like.

6 Claims, 6 Drawing Sheets

FOREIGN PATENT DOCUMENTS

| | | |
|---|---|---|
| JP | 07-168987 | 7/1995 |
| JP | 09-272096 | 10/1997 |
| JP | 10-120364 | 5/1998 |
| JP | 10-299035 | 11/1998 |
| JP | 11-237892 * | 8/1999 |
| JP | 2000-056287 * | 2/2000 |
| JP | 2000-86155 | 3/2000 |

* cited by examiner

VOICE-ACTUATED MACHINE BODY CONTROL APPARATUS FOR CONSTRUCTION MACHINE

TECHNICAL FIELD

This invention relates to a voice-actuated machine body control apparatus for a construction machine suitable for use, for example, with a hydraulic excavator for excavating the ground or a like machine.

BACKGROUND ART

Generally, a construction machine such as a hydraulic excavator has a construction wherein it includes, as schematically shown in FIG. 5, an upper revolving unit 100 with an operator cab (cabin) 600 provided on a lower traveling body 500 having caterpillar members 500A, and further, a joint type arm mechanism composed of a boom 200, a stick 300 and a bucket 400 is provided on the upper revolving unit 100.

And, the boom 200, stick 300 and bucket 400 can be driven suitably by hydraulic cylinders 120, 121 and 122, respectively, to move the move the boom 200 in the direction denoted by a or b, move the stick 300 in the direction denoted by c or d and move the bucket 400 in the direction denoted by e or f.

Further, various equipment and materials used for operation and display are provided in the operator cab 600 of the hydraulic excavator.

FIG. 6 is a schematic view of functional blocks of the hydraulic excavator. An operation unit 160 of the hydraulic excavator shown in FIG. 6 includes an electronic control apparatus 150. A joystick 6 and a pedal 9 are connected to the input side of the electronic control apparatus 150, and a monitor 10, a solenoid controlled proportional valve 3 and an ON/OFF valve 13 are connected to the output side of the electronic control apparatus 150.

Here, the joystick (also referred to as operation lever) 6 is an operation member for operating the hydraulic excavator and is operated by an operating person (hereinafter referred to sometimes as operator), and an electric signal corresponding to the operation amount of the joystick 6 is inputted to the electronic control apparatus 150. And, the electric signal detected by the joystick 6 is used to operate the cylinders 120 to 122 (hereinafter described with reference to FIG. 1) through the electronic control apparatus 150 and the solenoid controlled proportional valve 3.

Meanwhile, the pedal 9 is an accelerator pedal, and also an electric signal corresponding to the operation amount of the pedal 9 is inputted to the electronic control apparatus 150. In addition, the monitor 10 receives an electric signal outputted from the electronic control apparatus 150 and displays thereon information such as an engine speed or an operating oil temperature which the operator wants to know. Furthermore, the ON/OFF valve 13 is a main control valve and controls operation of the cylinders 120 to 122. And, the solenoid controlled proportional valve 3 utilizes a hydraulic pressure to control the spool position of the ON/OFF valve 13.

The electronic control apparatus 150 is connected to the monitor 10, solenoid controlled proportional valve 3, ON/OFF valve 13 and so forth described above, and displays control information to the operator and controls the cylinders 120 to 122 in accordance with a control mode. The electronic control apparatus 150 is composed of a microprocessor, memories such as a ROM (Read Only Memory) and a RAM (Random Access Memory), suitable input/output interfaces and so forth.

Thus, when signals from various sensors and the operation panel are inputted to the electronic control apparatus 150, the engine speed, operating oil temperature and so forth are displayed on the monitor 10. Further, the ON/OFF valve 13 is controlled through the solenoid controlled proportional valve 3 so that the boom 200, stick 300 and bucket 400 are controlled so as to exhibit desired expanded/contracted displacements.

Further, usually, in order to assure a high reliability in working, the operator is put under an obligation to normally aurally call confirmation items representative of machine body movement instructions during operation of the hydraulic excavator. The confirmation items (hereinafter referred to aural call items) are, for example, "engine start", "electric system check" and so forth, and those aural call items are aurally called by the operator upon movement of the machine body.

In addition, in an operating instruction manual or an operation manual, matters that demand attention of the operator are disclosed sufficiently so that the machine body may move appropriately.

With the conventional construction machine, however, since voice is not used to control the movement of the machine body, the operator is obliged to operate the complicated operation panel and so forth and must confirm the monitor screen. Therefore, the conventional construction machine has a subject in that, if working continues for a long time, it becomes bothering to the operator and the burden to the operator increases.

The conventional construction machine further has a subject that, if it is operated inappropriately by the operator, then there is the possibility that the machine body may operate in accordance with the inappropriate operation irrespective of a situation such as the position of the machine body or the working posture or the environment.

Also it is a subject of the conventional construction machine that, since the operation members such as the joystick 6 and the pedal 9 occupy a space of the operator cab 600, they reduce the range of operation of the operator.

The present invention has been made in view of such subjects as described above, and it is an object of the present invention to provide a voice-actuated machine body control apparatus for a construction machine by which the construction machine can be operated appropriately by voice uttered by an operator while the operator does not operate a joystick, a pedal or a like member and does not perform an inputting operation using a switch or a like device.

DISCLOSURE OF INVENTION

In order to attain the object described above, according to the present invention, a voice-actuated machine body control apparatus for a construction machine is characterized in that it comprises speech recognition means capable of speech-recognizing a voice command representative of an instruction by voice regarding a movement of a machine body, machine body control means capable of controlling the movement of the machine body based on a result of the recognition by the speech recognition means, obstacle recognition means capable of detecting the presence of an object outside the machine body which may possibly make an obstacle to the movement of the machine body, and avoidance means capable of inhibiting, when the presence of an object outside of the machine body is detected by the obstacle recognition means, the machine body movement in accordance with the voice command preferentially to the control by the machine body control means thereby to avoid an inappropriate movement of the machine body.

Accordingly, with the configuration described above, the operator can operate the machine body with a voice command, and there is an advantage that an inappropriate movement of the machine body can be prevented.

Further, the voice-actuated machine body control apparatus may be configured such that the avoidance means further includes priority degree determination means for determining a degree of priority regarding the inhibition of the machine body movement in accordance with the voice command, and an optimum machine body movement is performed using the degree of priority determined by the priority degree determination means.

And, the voice-actuated machine body control apparatus may be configured also such that the priority degree determination means determines the degree of priority such that the highest degree of priority is provided to a parameter regarding a person, and further such that the priority degree determination means determines the degree of priority such that, where the highest degree of priority is assured, a next highest degree of priority is provided to a parameter regarding the machine body.

Accordingly, with the configuration, there is an advantage that, whatever voice command is issued by the operator, an inappropriate movement of the machine body can be avoided.

Furthermore, the voice-actuated machine body control apparatus may further comprise speech notification means capable of notifying an operator by voice of a situation of avoidance by the machine body movement when the optimum machine body movement is performed.

Accordingly, with the configuration, when an inappropriate movement of the machine body is avoided, the situation is conveyed to the user by voice. Therefore, the operator can grasp the situation at a moment without watching a monitor in order to know the situation, and there is an advantage that the burden to the operator can be reduced.

BEST MODE FOR CARRYING OUT THE INVENTION (A) Description of the First Embodiment of the Present Invention In the following, an embodiment of the present invention is described with reference to the drawings.

Figure 1:
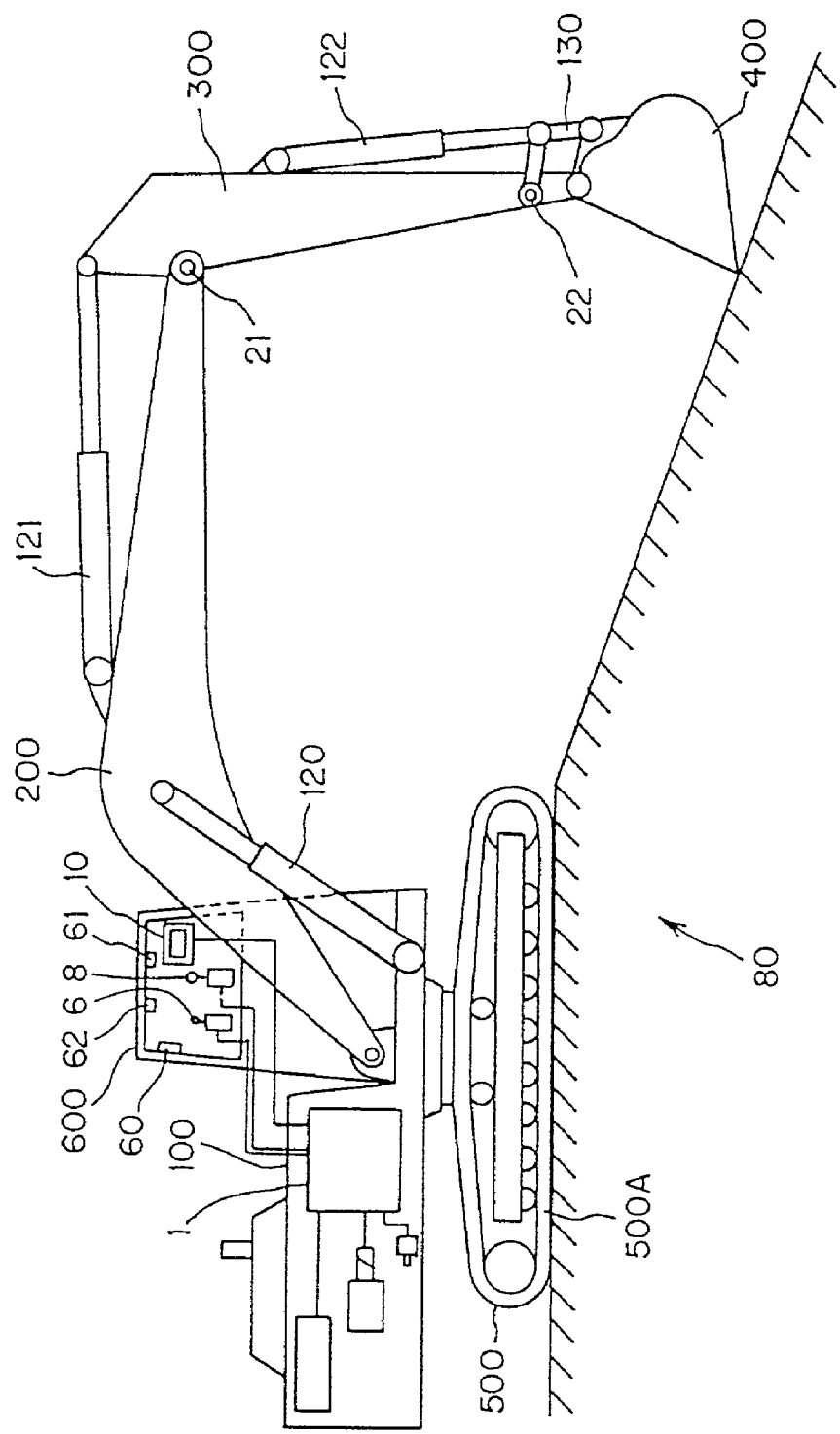
FIG. 1 is a schematic view showing a configuration of a hydraulic excavator according to an embodiment of the present invention.

FIG. 1 is a schematic view showing a configuration of a hydraulic excavator (construction machine) according to an embodiment of the present invention. The hydraulic excavator 80 shown in FIG. 1 includes an upper revolving unit 100 with an operator cab 600 provided for revolving movement in a horizontal plane on a lower traveling body 500 having caterpillar members 500A on the left and right thereof.

And, a boom 200 having one end connected for swinging motion is provided on the upper revolving unit 100, and a stick 300 connected at one end thereof for swinging motion by a joint part 21 is provided on the boom 200. Further, a bucket 400 which is connected at one end thereof for swinging motion by a joint part 22 and can excavate the ground with a tip thereof and accommodate earth and sand therein is provided on the stick 300. The boom 200, stick 300 and bucket 400 cooperatively form a joint type arm mechanism.

Further, as cylinder type actuators, a boom hydraulic cylinder 120, a stick hydraulic cylinder 121 and a bucket hydraulic cylinder 122 are provided. It is to be noted that, in the following description, the boom hydraulic cylinder 120 may be referred to as cylinder 120, the stick hydraulic cylinder 121 may be referred to as cylinder 121, and the bucket hydraulic cylinder 122 may be referred to merely as cylinder 122.

Here, the boom hydraulic cylinder 120 is connected at one end thereof for swinging motion to the upper revolving unit 100 and is connected at the other one end thereof for swinging motion to the boom 200. In other words, the boom hydraulic cylinder 120 is interposed between the upper revolving unit 100 and the boom 200, such that, as the distance between the opposite end portions is expanded or contracted, the boom 200 can be swung with respect to the upper revolving unit 100.

Meanwhile, the stick hydraulic cylinder 121 is connected at one end thereof for swinging motion to the boom 200 and connected at the other one end thereof for swinging motion to the stick 300. In other words, the stick hydraulic cylinder 121 is interposed between the boom 200 and the stick 300, such that, as the distance between the opposite end portions is expanded or contracted, the stick 300 can be swung with respect to the boom 200.

Further, the bucket hydraulic cylinder 122 is connected at one end thereof for swinging motion to the stick 300 and connected at the other one end thereof for swinging motion to the bucket 400. In other words, the bucket hydraulic cylinder 122 is interposed between the stick 300 and the bucket 400, such that, as the distance between the opposite end portions thereof is expanded or contracted, the bucket 400 can be swung with respect to the stick 300. It is to be noted that a linkage 130 is provided at a free end portion of the bucket hydraulic cylinder 122.

In this manner, a cylinder type actuator mechanism having a plurality of cylinder type actuators for driving the arm mechanism by performing expanding or contracting operations is formed using the cylinders 120 to 122 described above.

In the operator cab 600 shown in FIG. 1, joysticks 6 and 8, a monitor 10, an operation panel 60 with a keypad (also referred to merely as operation panel 60), a microphone 61, a speaker 62 and other elements are provided.

The joystick 6 is used for position adjustment of the stick 300 and for revolving operation of the upper revolving unit 100, and the joysticks is used for position adjustment of the boom 200 and the bucket 400. The joysticks 6 and 8 are individually tilted to a front, rear or neutral position or to a left, right or neutral position to effect position adjustment.

And, the positions of the joysticks 6 and 8 tilted by the operator are read by an electronic control apparatus 1 which is hereinafter described. Such various movements as, for example, to move the boom 200 upwardly or downwardly, to move the stick 300 to the inner side (this movement is called stick in) or to the outer side (this movement is called stick out) or to move the bucket to scoop/discharge earth are performed.

In addition, the monitor 10 monitors a working situation and so forth and principally displays an engine speed, an oil temperature and so forth. Furthermore, the operation panel 60 is operated in order to cause information, which the operator wants to known, to be displayed. The microphone 61 converts voice into an electric signal and inputs the electric signal to the electronic control apparatus 1. It is to be noted that the electric signal outputted from the microphone 61 is inputted through an amplifier (not shown) to the electronic control apparatus 1, by which a speech recognition process is performed as hereinafter described. Further, the speaker 62 is used for notification with synthesized voice and also for notification of warning sound.

It is to be noted that, though not shown in FIG. 1, two travelling pedals are provided in the operator cab 600. The left travelling pedal is used to cause the left crawler to move forwardly or backwardly, and the right travelling pedal is used to cause the right crawler to move forwardly or backwardly. If the operator operates the two travelling pedals simultaneously, then the hydraulic excavator 80 travels forwardly or backwardly.

Figure 2:
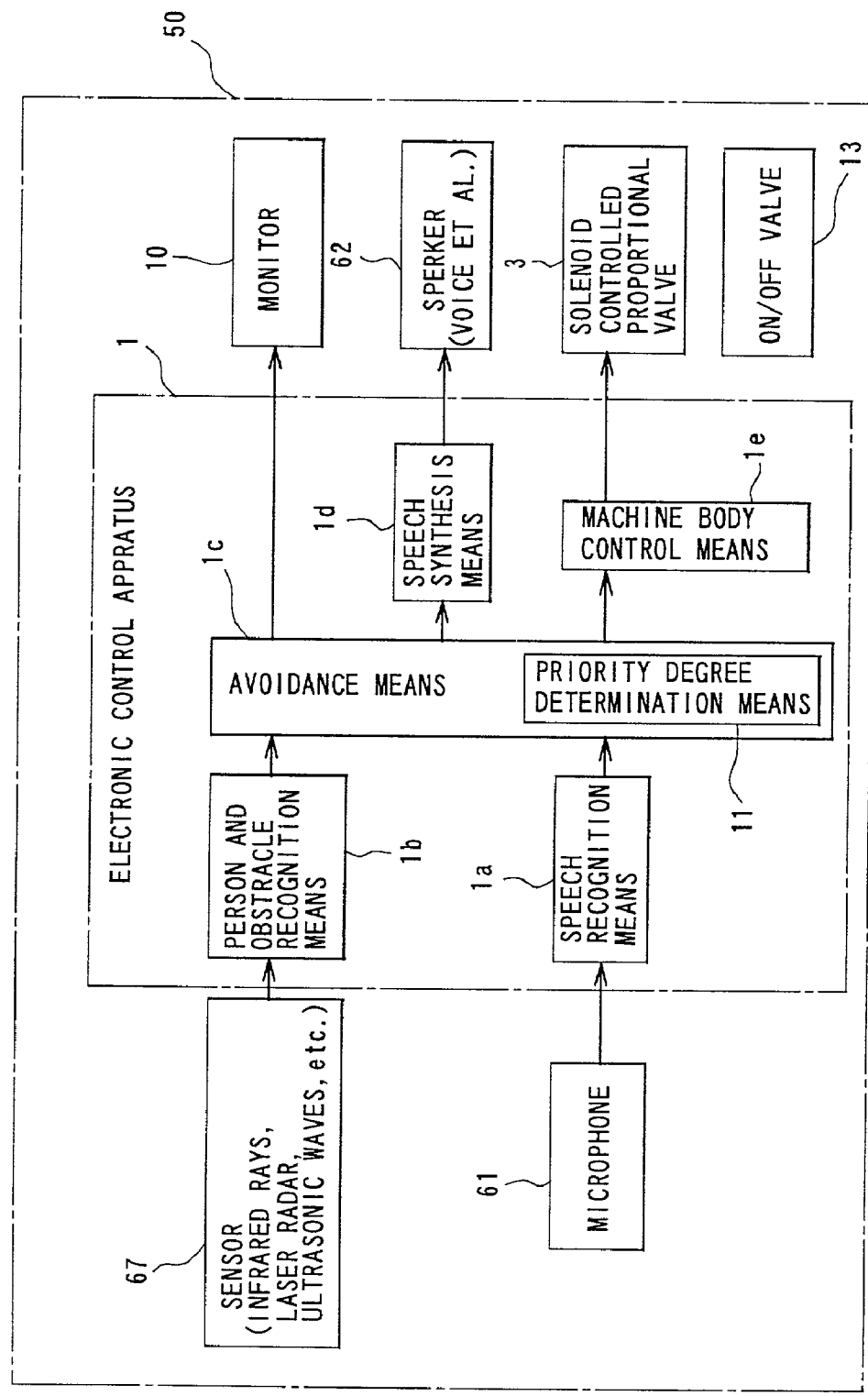
FIG. 2 is a functional block diagram of an electronic control apparatus according to the embodiment of the present invention.

FIG. 2 is a functional block diagram of the electronic control apparatus 1 according to the embodiment of the present invention. A sensor 67 and the microphone 61 are connected to the input side of the electronic control apparatus 1, and the monitor 10, speaker 62, solenoid controlled proportional valve 3 and ON/OFF valve 13 are connected to the output side of the electronic control apparatus 1.

Here, the sensor 67 detects the presence of a human being or an object and is a sensor which uses one of wavelengths such as infrared rays, a laser radar or ultrasonic waves. And, the information detected by the sensor 67 is inputted to the electronic control apparatus 1.

Further, the ON/OFF valve 13 is a main control valve and control movements of the cylinders 120 to 122. And, the solenoid controlled proportional valve 3 uses a hydraulic pressure to control the spool position of the ON/OFF valve 13.

Now, the electronic control apparatus 1 shown in FIG. 2 functions as a voice-actuated machine body control apparatus for the construction machine and includes speech recognition means 1*a*, machine body control means 1*e*, person and obstacle recognition means 1*b*, avoidance means 1*c* and speech synthesis means 1*d*.

Here, the speech recognition means 1*a* can recognize a voice command representative of an instruction by voice regarding a movement of the machine body by speech recognition. The machine body control means 1*e* can control the movement of the machine body based on a result of the recognition of the speech recognition means 1*a*.

And, the person and obstacle recognition means (obstacle recognition means) 1*b* detects the presence of an object outside the machine body which may possibly make an obstacle to a movement of the machine body. If the person and obstacle recognition means 1*b* detects the presence of an object outside the machine body, then the avoidance means 1*c* inhibits the movement of the machine body in accordance with a voice command preferentially to the control by the machine body control means 1*e* so that an inappropriate movement of the machine body can be prevented.

Further, the avoidance means 1*c* includes priority degree determination means 1*f* for determining the degree of priority regarding inhibition of a movement of the machine body in accordance with a voice command, and an optimum machine body movement is performed using the degree of priority determined by the priority degree determination means 1*f*.

In addition, the avoidance means 1*c* includes the priority degree determination means 1*f* for determining the degree of priority based on a situation of the machine body and a situation of an environment around the machine body, and performs an optimum machine body movement using the degree of priority determined by the priority degree determination means 1*f*.

The priority degree determination means 1*f* determines the degree of priority such that a parameter regarding a person (for example, the superiority of an operator or a worker at the site to the machine body is assured) has the highest degree of priority. Further, where the highest degree of priority is assured, the priority degree determination means 1*f* determines the priority degree such that a parameter regarding the machine body (for example, an appropriate movement of the machine body is assured) has the next highest degree of priority. It is to be noted that the next highest degree of priority signifies that the second and following highest degrees of priority are present.

In addition, the speech synthesis means 1*d* can output synthesized speech obtained by synthesis of voice, and the synthesized speech is issued from the speaker 62. And the speech synthesis means 1*d* and the speaker 62 cooperatively function as voice notification means. In particular, the voice notification means is connected to the avoidance means 1*c*, and when an optimum machine body movement is performed, it can notify the operator by voice of a situation of avoidance by the machine body movement.

It is to be noted that the functions of the speech recognition means 1*a*, machine body control means 1*e*, person and obstacle recognition means 1*b*, avoidance means 1*c* and speech synthesis means 1*d* are exhibited by means of a microprocessor, memories such as a ROM and a RAM, suitable input/output interfaces and other necessary elements.

Thus, a voice command issued by the operator is converted into a voice signal by the microphone 61, and the voice command is recognized by speech recognition by the speech recognition means 1*a*. Meanwhile, a signal representative of the presence of a worker at the site who is behind the hydraulic excavator 80 or some other vehicle for construction is inputted from the sensor 67 to the person and obstacle recognition means 1*b*, by which the presence of them is detected.

Then, based on the priority degree, a signal for inhibiting the machine body movement in accordance with the voice command is outputted from the avoidance means 1*c*, and an indication that the machine body operation is inhibited is displayed on the monitor 10 so that this is visually conveyed to the operator. Meanwhile, another signal from the avoidance means 1*c* is inputted to the speech synthesis means 1*d*, and synthesized speech representing that the machine body movement is inhibited is issued from the speaker 62.

Through such a configuration as described above, the operator aurally calls a voice command such as "boom up" or "stick in" to operate the hydraulic excavator 80 appropriately, but if there is the possibility that a movement of the machine body in accordance with the voice command may be an inappropriate movement in the relation to an obstacle around the machine body, the machine body movement in accordance with the voice command is inhibited. In the following, the inhibition of the machine body movement is described taking two different manners thereof as an example.

Figure 3:
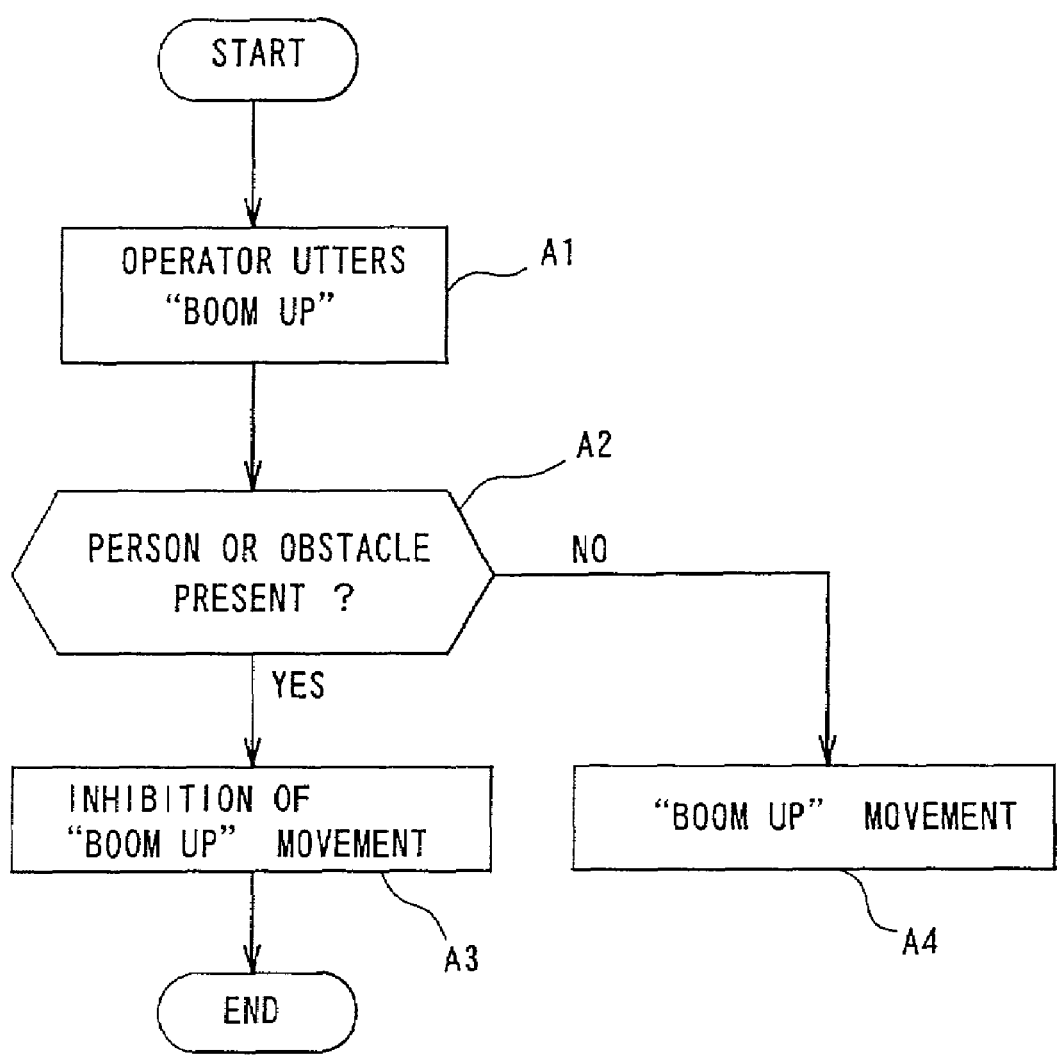
FIG. 3 is a flow chart illustrating a first manner of voice-actuated machine body control according to the embodiment of the present invention.

FIG. 3 is a flow chart illustrating the first manner of voice-actuated machine body control according to the embodiment of the present invention and represents the machine body control when the operator issues a voice command different from an intended voice command. First, if the operator utters, for example, "boom up" (step A1), then it is discriminated whether or not a worker at the site or an obstacle is present in front of the hydraulic excavator 80 (step A2). Here, if a worker at the site or the like is present, then the processing follows the YES route, and the boom up movement of the hydraulic excavator 80 is inhibited (step A3). On the other hand, if a worker at the site or the like is not present in step A2, then the processing follows the NO route, and a boom up movement is performed (step A4).

Further, even if the operator utters "forward" or "backward" while, for example, a vehicle for construction or some other construction machine is present in front or in the rear of the hydraulic excavator 80, a backward movement of the hydraulic excavator 80 is inhibited, and also when the hydraulic excavator 80 starts its operation after it stops once, occurrence of an inappropriate running situation of the hydraulic excavator 80 is avoided.

Since the burden to a worker at the side who is outside the machine body is reduced and a machine body movement in accordance with a voice command is inhibited preferentially to normal control in such a manner as described above, the working environment is improved.

Figure 4:
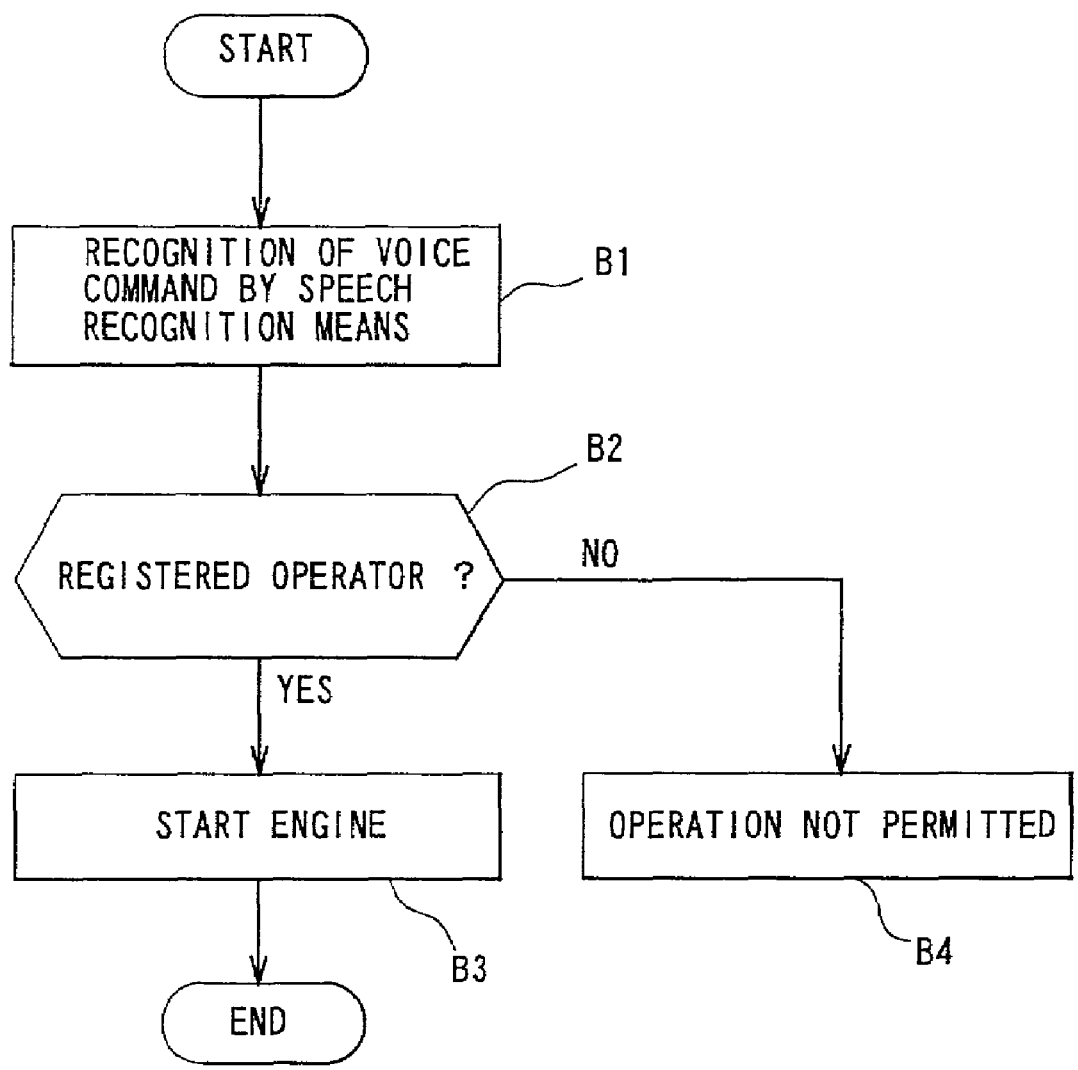
FIG. 4 is a flow chart illustrating a second manner of voice-actuated machine body control according to the embodiment of the present invention.
Figure 5:
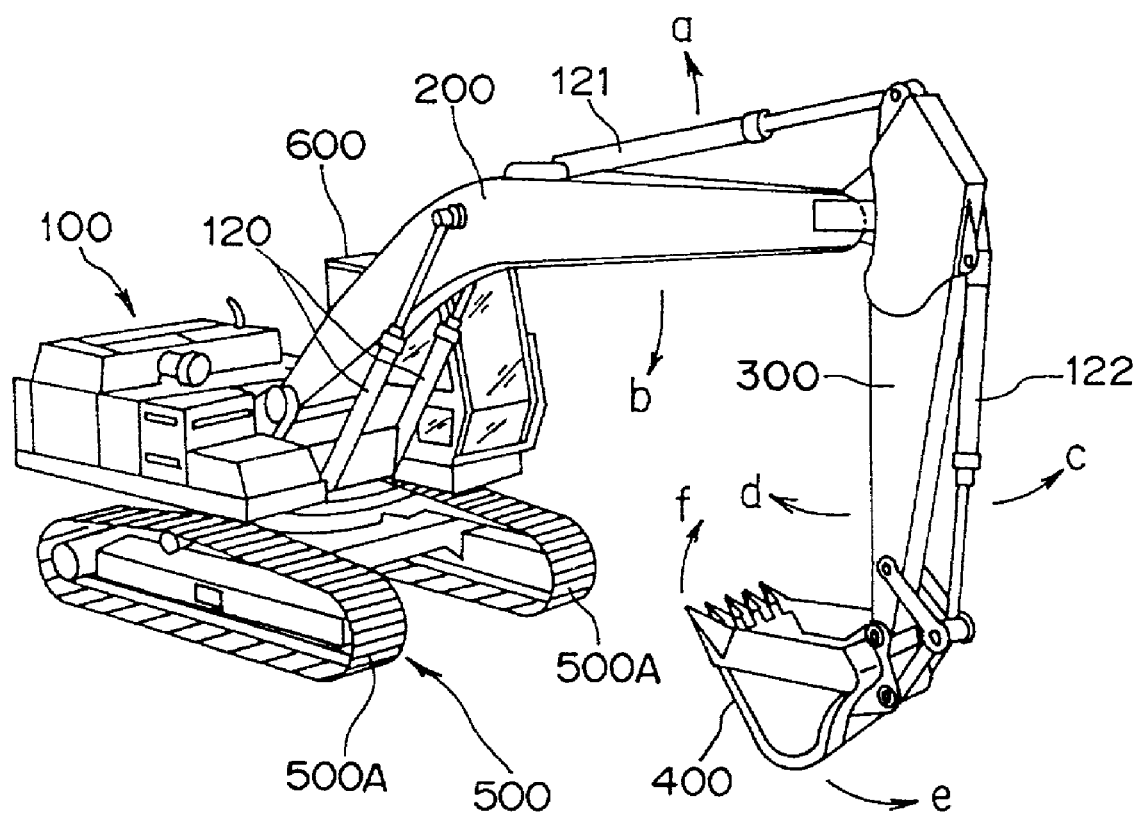
FIG. 5 is a perspective view of a common construction machine.
Figure 6:
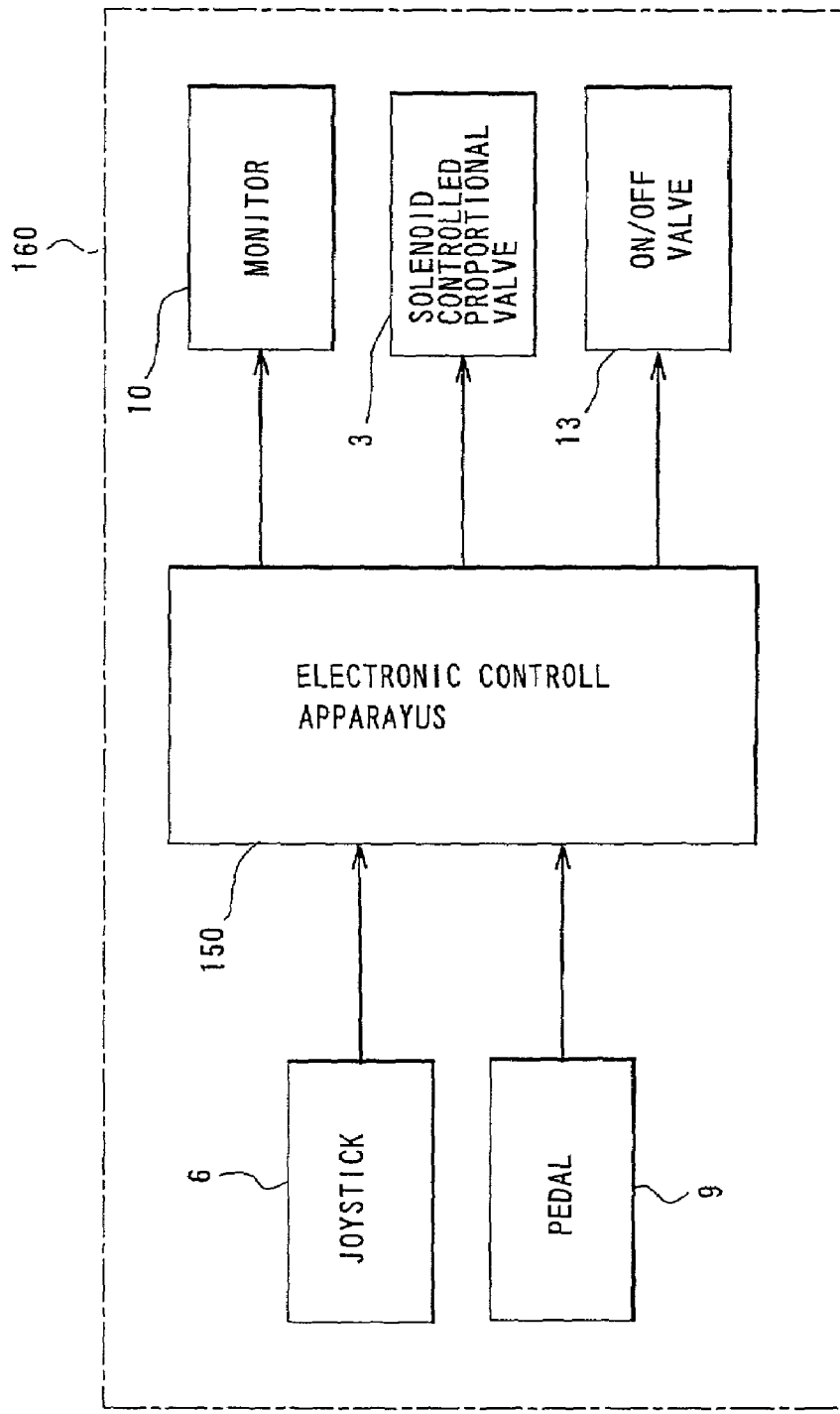
FIG. 6 is a schematic view of functional blocks of a construction machine.

FIG. 4 is a flow chart illustrating the second manner of voice-actuated machine body control according to the embodiment of the present invention. First, a voice command (for example, "engine start") obtained by the microphone 61 is recognized by the speech recognition means 1a (step B1), and here, it is discriminated whether or not the voice command is of a registered operator (step B2). Then, if the speech recognition means 1a discriminates that the voice command is of a person who is registered as an operating person of the hydraulic excavator 80, then the processing follows the YES route, and the operation movement (for example, start of the engine) corresponding to the voice command is permitted in step B3. However, if the discrimination in step B2 is in the negative, then the processing follows the NO route, and the operation movement of the machine body is not permitted (step B4).

Further, even if a voice command, for example, of a trick or the like is uttered, if the uttered voice command is not a permitted one, then the movement of the hydraulic excavator 80 is not permitted.

In this manner, if an inappropriate voice command is issued from any other person than the operator, the machine body movement is not permitted, and therefore, even if some other person than the operator issues a voice command such as "engine start", for example, for the object of the theft, the theft can be prevented. Further, even if a voice command is issued from a trick or the like, an inappropriate movement of the machine body can be prevented.

And, since the operator can cause the machine body to operate with a voice command in this manner, this can contribute to improvement of the working environment of the worker.

Further, since an operation through a voice command is used, the joysticks 6 and 8, the pedal and so forth are not necessitated any more and the degree of freedom of the hands and the feet of the operator increases, and a wide space can be assured in the operator cab 600 and the space can be utilized effectively. In addition, the size of the outward form of the hydraulic excavator 80 can be made significantly compact.

Furthermore, when an inappropriate movement of the machine body is avoided in this manner, since a situation is conveyed to the operator by voice, the operator can watch a display of the situation on the monitor 10, and the burden to the operator decreases.

In addition, whatever voice command is issued by the operator, an inappropriate movement of the machine body can be avoided in this manner.

It is to be noted that the present invention is not limited to the embodiment described above and can be carried out in various modified forms without departing from the spirit of the present invention.

The present invention is not limited to the hydraulic excavator 80 described above, but can be applied also to any other construction machine whose operation requires, for example, the use of both hands.

Industrial Applicability of the Invention

As described above, with the voice-actuated machine body control apparatus for a construction machine of the present invention, an inappropriate movement of the machine body can be avoided and the safety is improved.

Further, with the voice-actuated machine body control apparatus for a construction machine of the present invention, even if the operator does not watch a monitor in order to know a situation, the operator can grasp the situation at a moment, and the burden to the operator can be reduced and the safety is further improved.

What is claimed is:

1. A voice-actuated machine body control apparatus for a construction machine, comprising:
speech recognition means capable of speech-recognizing a voice command representative of an instruction by voice regarding a movement of a machine body;
machine body control means capable of controlling the movement of said machine body based on a result of the recognition by said speech recognition means;
obstacle recognition means capable of detecting the presence of an object outside said machine body which may be an obstacle to the movement of the machine body; and
avoidance means capable of inhibiting, when the presence of an object outside of said machine body is detected by said obstacle recognition means, the machine body movement by said machine body control means thereby to avoid an inappropriate movement of said machine body,
wherein said speech recognition means discriminates whether or not the voice command is issued by a registered operator, and
when the speech recognition means discriminates that the voice command is issued by the registered operator, said machine body control means permits the machine body movement, and
when the speech recognition means discriminates that the voice command is not issued by the registered operator, said machine body control means inhibits the machine body movement.

2. The voice-actuated machine body control apparatus for a construction machine as set forth in claim 1, wherein said avoidance means further comprises:

priority degree determination means for determining a degree of priority regarding the inhibition of the machine body movement in accordance with the voice command; and an optimum machine body movement is performed using the degree of priority determined by said priority degree determination means.

3. The voice-actuated machine body control apparatus for a construction machine as set forth in claim 2, wherein said priority degree determination means determines the degree of priority such that the highest degree of priority is provided to a parameter regarding a person.

4. The voice-actuated machine body control apparatus for a construction machine as set forth in claim 3, wherein said priority degree determination means determines the degree of priority such that, where the highest degree of priority is assured, a next highest degree of priority is provided to a parameter regarding said machine body.

5. The voice-actuated machine body control apparatus for a construction machine as set forth in claim 4, further comprising speech notification means capable of notifying an operator by voice of a situation of avoidance by the machine body movement when the optimum machine body movement is performed.

6. The voice-actuated machine body control apparatus for a construction machine as set forth in claim 3, further comprising speech notification means capable of notifying an operator by voice of a situation of avoidance by the machine body movement when the optimum machine body movement is performed.

* * * * *